United States Patent Office 3,784,582
Patented Jan. 8, 1974

3,784,582
1-AMIDINO-3-(CYANOPHENYL)UREAS
Leslie Percy Walls, London, England, assignor to
Burroughs Wellcome, Research Triangle Park, N.C.
No Drawing. Continuation-in-part of application Ser. No.
650,225, June 30, 1967, now Patent No. 3,539,616.
This application June 30, 1970, Ser. No. 51,325
Claims priority, application Great Britain, July 7, 1966,
30,479/66; Dec. 16, 1966, 56,546/66; Feb. 3, 1967,
5,391/67; Apr. 25, 1967, 19,028/67
The portion of the term of the patent subsequent to
Nov. 10, 1987, has been disclaimed
Int. Cl. C07c 121/78
U.S. Cl. 260—465 D                              8 Claims

ABSTRACT OF THE DISCLOSURE 1-amidino-3-(substituted-phenyl)urea compounds of the formula

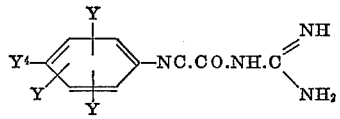

and pharmaceutically acceptable acid addition salts thereof, wherein $Y^4$ is halogen or cyano and Y is hydrogen, halogen, methyl or cyano; provided that one of the substituents $Y^4$ and Y's but not both is always cyano, and that not more than three of the substituents $Y^4$ and the Y's is a substituent other than hydrogen; and provided that not more than one of the substituents $Y^4$ and the Y's is methyl.

---

This application is a continuation-in-part of U.S. patent application No. 650,225, filed June 30, 1967, now U.S. Pat. No. 3,539,616.

This invention relates to 1-amidino-3-(substituted-phenyl)urea compounds and more particularly to selected compounds of the above general class of compounds, which are highly and unexpectedly effective as antimalarial drugs.

During the last forty years, a number of safe and highly effective synthetic chemicals have been developed for use against malaria infections in humans. These chemicals include chloroquine, proguanil (chloroguanide), primaquine and pyrimethamine. All are currently used for treating various forms of infection, but no single synthetic antimalarial drug is ideal for treatment and prophylaxis of all malaria infections. Resistance to these drugs by malaria parasites has now been reported from various parts of the world and this has stimulated research into new types of antimalarial drugs to add to the armory of the physician.

1-(N-alkylamidino)-3-phenylureas are a class of synthetic chemicals which were investigated in the late 1940's for antimalarial activity and were found not worthy of further investigation (Curd, F. H. S. et al., J. Chem. Soc., 1949, 1732). Further, 1-amidino-3-phenylureas were investigated by Urbanski in 1960, who indicated that, of a large class of 1-amidino-3-(monosubstituted-phenyl)ureas, the highest activity against the malaria parasite *Plasmodium gallinaceum* in chicks was obtained with 1-amidino-3-(4-nitrophenyl)urea (Skowronska-Serafin, B. & Urbanski, T., Tetrahedron, 10, 12–25 (1960)).

It has now been found that compounds of Formula I also have activity as antimalarials.

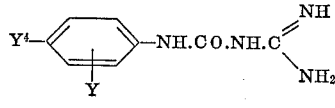

In Formula I
$Y^4$ is halogen when Y is a substituent trifluoromethyl, nitrile or nitro at the 3-position or a substituent halogen at the 3-position or both the 2- and 5-positions; or
$Y^4$ is trifluoromethyl or nitrile when Y is hydrogen or is a substituent halogen or methyl at the 2- or 3-position; or
$Y^4$ is nitro when Y is a substituent trifluoromethyl or halogen at the 3-position.

In this formula, halogen is chlorine, bromine, fluorine and iodine, but chlorine is especially preferred.

A subclass of the compounds of Formula I which have a cyano substituent are of the Formula Ia

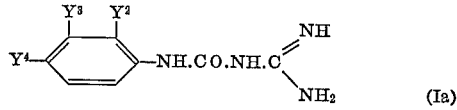

and pharmaceutically acceptable acid addition salts thereof where $Y^2$ is methyl, halogen or hydrogen, $Y^3$ is methyl, halogen, cyano or hydrogen, and $Y^4$ is cyano or halogen; provided than when $Y^4$ is cyano, $Y^2$ and $Y^3$ are halogen, hydrogen or methyl and that at least one of $Y^2$ and $Y^3$ is hydrogen; and provided that when $Y^3$ is cyano, $Y^4$ is halogen and $Y^2$ is hydrogen; and further provided that one, but not both of $Y^3$ and $Y^4$ is always cyano.

It has now been further found that compounds embraced by the statement of Formula Ib also possess marked antimalarial activity, and some are superior to the compounds embraced in the narrower statement of Formulae I and Ia

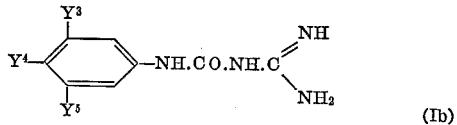

In Formula Ib, $Y^3$ and $Y^4$ are halogen selected from the class consisting of chlorine, bromine, iodine and fluorine, and $Y^4$ is cyano. A particularly preferred compound of this formula is 1-amidino-3-(3,5-dichloro-4-cyanophenyl)urea and pharmaceutically acceptable acid addition salts thereof.

The following preferred compounds of Formula I and their acid addition salts exhibit exceptional activity as antimalarials:

1-amidino-3-(4-chloro-3-cyanophenyl)urea
1-amidino-3-(3-chloro-4-cyanophenyl)urea
1-amidino-3-(3,4-dichlorophenyl)urea
1-amidino-3-(4-trifluoromethylphenyl)urea
1-amidino-3-(4-chloro-3-trifluoromethylphenyl)urea.

It has also been found that the following compounds of Formula I and their acid addition salts, exhibit a high activity as antimalarials:

1-amidino-3-(4-cyanophenyl)urea
1-amidino-3-(4-cyano-3-methylphenyl)urea
1-amidino-3-(3-chloro-4-nitrophenyl)urea
1-amidino-3-(4-cyano-3-fluorophenyl)urea
1-amidino-3-(4-cyano-2-methylphenyl)urea.

The following compounds of Formula I and their acid addition salts have been found to exhibit marked activity as antimalarials:

1-amidino-3-(2-chloro-4-cyanophenyl)urea
1-amidino-3-(4-chloro-3-nitrophenyl)urea.

Activity as antimalarials is also exhibited by the following compounds of Formula I and their acid addition salts.

1-amidino-3-(2-bromo-4-cyanophenyl)urea
1-amidino-3-(4-nitro-3-trifluoromethylphenyl)urea
1-amidino-3-(2,4,5-trichlorophenyl)urea.

Amidinourea compounds of the present invention exhibiting antimalarial activity are therefore embraced by the following Formula Ic

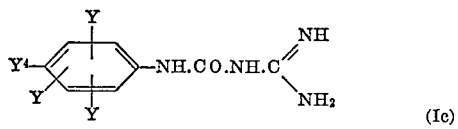

and pharmaceutically acceptable acid addition sals thereof wherein $Y^4$ is halogen or cyano and Y is hydrogen, halogen, methyl or cyano; provided that one of the substituents $Y^4$ and the Y's but not both is always cyano, and that not more than three of the substituents $Y^4$ and the Y's is a substituent other than hydrogen; and provided that not more than one of the substituents $Y^4$ and the Y's is methyl.

The amidinoureas of Formulae I, Ia, Ib and Ic and their acid addition salts, are active against *P. gallinaceum* in chicks and *P. vinckei* and *P. berghei* in mice. They are also active against strains of *P. gallinaceum* resistant to pyrimethamine or dihydrotriazines and strains of *P. gallinaceum* resistant to pyrimethamine or dihydrotriazines and strains of *P. berghei* resistant to chloroquine. The compounds of Formula I are also more active against *P. gallinaceum* and, in many instances, are also more active against *P. vinckei* than the known 1-amidino-3-(4-nitrophenyl)urea.

The activities of the above listed compounds reside in the base and the acid in the acid addition salts is of less importance, though it is preferably pharmacologically and pharmaceutically acceptable. For example, the acid may be hydrochloric, sulphuric, toluene-p-sulphonic, p-chlorobenzenesulphonic, malic or tartaric acid. Ethanesulphonic and methane sulphonic acids are preferred since they provide salts having a higher solubility than most other salts.

The compounds of Formula Ic may be made by any known method for mixing compounds of analogous chemical structure, although some methods are preferred for the ease of preparation and adaptation to a large scale.

Thus a biguanide of Formula II

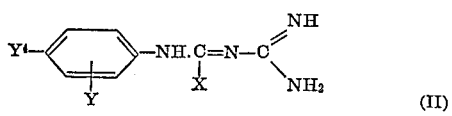

(in which X is an imino group) may be converted to a compound of Formula Ic by reaction with excess of nitrous acid, preferably at 0° to 20°, or by hydrolysis with a strong aqueous acid, for example ethanesulphonic acid, methanesulphonic acid or hydrochloric acid, preferably between about 20° to 90° C. The biguanide starting materials may be made by a number of methods well documented in the literature (see for example "Chemistry of Carbon Compounds," ed. E. H. Rodd, 1st ed., vol. III, Part A, 1954 at p. 198 et seq.).

As another example, a S-alkyl-1-amidino-3-(substituted-phenyl)-thiourea of Formula II (in which X is an S-alkyl group) may be oxidized to a compound of Formula Ic, preferably using a peroxide, for example hydrogen peroxide, as an oxidizing agent. The S-substituted-thiourea starting material may be prepared from the corresponding 1-amidino-3-(substituted-phenyl)thiourea, which itself may be made by reaction of the appropriate isothiocyanate with guanidine.

Another type of method of preparing amidinoureas of Formula Ic is by the reaction of guanidine with a reactive derivative of a substituted-phenylcarbamic acid of Formula III

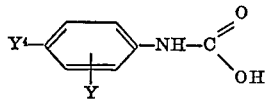

for example an isocyanate (the internal anhydride), or an urea (the amide). Other reactive derivatives which may be used are esters, for example, a urethane which is preferably reacted with an anhydrous solution of guanidine base. A substituted-amide may also be used, for example, fusion of an N,N-dialkyl-N'-arylcarbamide with guanidine base will provide a compound of Formula Ic.

The product formed by any of the described reactions will be a 1-amidino-3-(substituted-phenyl)urea, in the form of the base or an acid addition salt thereof, and may then be converted, as appropriate, into an acid addition salt, a salt of another acid or the base by reaction with an acid, a salt thereof or a base, for example, in solution or on an ion exchange column. Thus, reaction of an acid addition salt with an alkali such as sodium hydroxide yields the 1-amidino-3-(substituted-phenyl)urea base.

For treatment or prophylaxis of malaria, the compounds of Formula I, Ia, Ib or Ic may be presented with an acceptable carrier therefor as pharmaceutical compositions, preferably as a tablet for oral administration. The compositions may be made by any convenient method comprising the admixture of the compounds. The substituted-amidinourea may be in the form of its base or as an addition salt thereof.

For oral administration, fine powders or granules of the compounds may contain diluents and dispersing and surface active agents and may be presented in a draft, in water, or in a syrup; in capsules or cachets in the dry state, or in an aqueous or non-aqueous suspension, when a suspending agent may also be included; in tablets, preferably made from granules of the active ingredient with a diluent by compression with binders and lubricants, or in a suspension in water or a syrup, or an oil, or in a water/oil emulsion, when flavoring, preserving, suspending, thickening and emulsifying agents may also be included. The granules or the tablets may be coated, and the tablets may be scored.

For parenteral administration, the compounds may be presented in unit dose or multi-dose containers, in aqueous or non-aqueous injection solutions which may contain antioxidants, buffers, bacteriostats and solutes which render the compounds isotonic with the blood, or in aqueous or non-aqueous suspension when suspending agents and thickening agents may also be included, extemporaneous injection solutions and suspensions may be made from sterile powders, granules or tablets which may contain diluents, dispersing and surface active agents, binders and lubricants.

In treating infections of malaria in animals and mammals (i.e. man), a dose of from 1 to 100 mg./kg. of body weight would be used.

The present invention provides a process for the treatment or prophylaxis of malaria, which comprises administering a compound of Formula I, Ia, Ib or Ic, preferably in an amount within the dose range from 1 to 100 mg./kg., to the host or potential host (i.e. mammal, warm-blooded animal such as man, mice and chickens) of the infection.

The following are examples of this invention. (All temperatures are in degrees Celsius.)

EXAMPLE 1

4-chloro-3-cyanoaniline (6.1 g.), dicyandiamide (3.7 g.), water (16 ml.) and concentrated hydrochloric acid (3.6 ml.) were heated under reflux for 30 minutes. With cooling a hydrochloride crystallized which was collected by filtration and washed with a little water. This crude salt was dried and recrystallized from alcohol. 4-chloro-3-cyanophenylbiguanide hydrochloride then separated as white needles (6.4 g.), M.P. 233° with effervescence. The base was obtained as small white needles when the solution of this salt was made alkaline with sodium hydroxide; recrystallized from alcohol, it formed colorless prisms, M.P. 202° with effervescence.

The biguanide base (3.2 g.) was dissolved in N-ethanesulphonic acid (32 ml.) and kept at 90° for 2 hours, during which period colorless crystals of 1-amidino-3-(4-chloro-3-cyanophenyl)urea ethanesulphonate separated. This salt was collected after cooling (2.8 g.), and was recrystallized from methanol (or water) and formed white needles, M.P. 219°. The base was obtained by treating an aqueous solution of the salt with sodium hydroxide. It formed white needles, M.P. 222°, which could be further purified by recrystallization from alcohol. This substance was sparingly soluble in water.

EXAMPLE 2

In the manner described in Example 1, 3-chloro-4-cyanoaniline was converted to 3-chloro-4-cyanophenylbiguanide hydrochloride, which formed white matted needles from methanol, M.P. 258° with effervescence (the corresponding base formed white prisms from alcohol, M.P. 181°).

The biguanide (5 g.) was dissolved in 0.5 N-ethanesulphonic acid (100 ml.) and the solution was kept at 90° for 2 hours. With cooling, a high yield of 1-amidino-3-(3-chloro-4-cyanophenyl)urea ethanesulphonate crystallized in white prisms, M.P. 224° (the corresponding base crystallized from alcohol had a M.P. 213°).

EXAMPLE 3

Dichloramine-T (6 g.) was added to a solution of 4-cyanoaniline (5.9 g.) in chloroform (59 ml.). After 4 hours the filtered solution was evaporated and the residue was lixiviated with N-NaOH. The undissolved crystalline material (6 g.) was 2-chloro-4-cyanoaniline, M.P. 99–100°; after recrystallization from aqueous alcohol it had a M.P. 102°.

2-chloro-4-cyanoaniline (4.2 g.), dicyandiamide (7.5 g.), concentrated hydrochloric acid (6.6 ml.) and water (15 ml.) were heated under reflux for 15 minutes. The crude hydrochloride that crystallized with cooling was separated, dried and heated with alcohol. The residue (4.1 g.) of 2-chloro-4-cyanophenylbiguanide hydrochloride had a M.P. 243° with effervescence, and a M.P. of 244° after recrystallization from water (the corresponding base formed white needles, M.P. 193° with effervescence).

When a solution of the biguanide (3.5 g.) in N-ethanesulphonic acid (35 ml.) was kept at 90° for 3 hours and then cooled, 1-amidino3-(2-chloro - 4 - cyanophenyl)urea ethanesulphonate (4.4 g.) separated in colourless prisms, M.P. 211–214°; recrystallization from methanol gave a product, M.P. 214° (the corresponding base formed white needles, M.P. 210° with effervescence).

EXAMPLE 4

2-bromo-4-cyanoaniline was converted in the manner described in Example 2 to 2-bromo-4-cyanophenylbiguanide hydrochloride, M.P. 234° (the corresponding base, white needles, M.P. 200°). This biguanide was converted in the manner described in Example 3 to 1-amidino-3-(2-bromo - 4 - cyanophenyl)urea ethanesulphonate, white prisms from methanol, M.P. 210° (corresponding base formed white needles, M.P. 206° with effervescence).

EXAMPLE 5

4-cyano-3-methylaniline was converted in the manner described in Example 1 to 4-cyano-3-methylbiguanide hydrochloride, M.P. 232° after recrystallization from water (the corresponding base had M.P. 172° after recrystallization from alcohol). In the manner described in Example 1, this biguanide was converted into 1-amidino-3-(4- cyano-3-methylphenyl)urea ethanesulphonate, white prisms from water, M.P. 232° (the corresponding base formed white leaflets after crystallization from water, M.P. 200.5°).

EXAMPLE 6

4-cyano-2-methylaniline was converted in the manner described in Example 1 to 4-cyano-2-methylphenylbiguanide hydrochloride which separated from water in white needles, M.P. 256° (the corresponding base: white prisms after separation from alcohol, M.P. 183° with effervescence). This biguanide was then converted in the manner described in Example 1 to 1-amidino-3-(4-cyano-2- methylphenyl)urea ethanesulphonate which crystallized from methanol in white needles, M.P. 204° (the corresponding base: white needles after separation from water, M.P. 171°).

EXAMPLE 7

To a solution of 4-cyanoaniline (5.9 g.) in acetone (60 ml.) were added anhydrous sodium carbonate (5.3 g.) and ethyl chloroformate (5.5 g.). The mixture was heated under reflux for 3 hours and then filtered. The filtrate was evaporated to dryness and the residues was crystallized from aqueous alcohol. The product, p-cyanophenylurethane, formed pale yellow prisms (7.4 g.), M.P. 115.5°.

Guanidine hydrochloride (2.9 g.) was added to a solution of sodium (0.7 g.) in ethanol (60 ml.) p-Cyanophenylurethane (4.9 g.) was then added and the mixture was heated under reflux for 4 hours and filtered hot. The residue left after evaporation of the filtrate was lixiviated with aqueous alcohol (20 ml. alcohol, 10 ml. water). The undissolved crystalline residue of crude 1-amino-3-p-cyanophenylurea (1.5 g.), M.P. ca. 199°, was purified by recrystallization from N-ethanesulphonic acid as the ethanesulphonate, M.P. 219–220°, identical with the product described in Example 9.

EXAMPLE 8

In the manner described in Example 1, 3,4-dichloroaniline was converted to 3,4-dichlorophenylbiguanide hydrochloride, which formed white needles, M.P. 230°, from water (the corresponding base: white leaflets after separation from alcohol, M.P. 154°). This biguanide was converted in the manner of Example 1 to 1-amidino-4-(3,4-dichlorophenyl)urea ethanesulphonate, which gave white prisms from water, M.P. 224° (the corresponding base: hydrated white needles after separation from water, M.P. 95–98°).

EXAMPLE 9 p-Cyanoaniline (11.8 g.) was dissolved in 2 N-hydrochloric acid (50 ml.) at 90° and the solution was stirred as dicyandiamide (8.4 g.) was added. The mixture was heated under reflux for 30 minutes, the product, p-cyanophenylbiguanide hydrochloride, separating meanwhile. After cooling, this salt (20 g.) was collected and washed with water, M.P. 277° with decomposition.

Metathesis of this salt with silver ethanesulphonate in water furnished a solution of p-cyanophenylbiguanide ethanesulphonate, evaporation of which gave the crystalline salt. Recrystallization from alcohol gave white leaflets, M.P. 209–211°.

A solution of p-cyanophenylbiguanide ethanesulphonate (13.5 g.) in ethanesulphonic acid (120 ml.) at room temperature slowly deposited colorless prisms of 1-amidino-3-(4-cyanophenyl)urea ethanesulphonate, M.P. 218–219° with effervescence. A yield of 50% was obtained in 7 days but longer standing gave 80%.

A solution of the urea ethanesulphonate salt in hot water was made alkaline with 10 N-sodium hydroxide and the base crystallized in white prismatic needles, M.P. 205° with effervescence.

A solution of p-cyanophenylbiguanide ethanesulphonate (10 g.) in ethanesulphonic acid (500 ml.) was treated dropwise with a concentrated aqueous solution of sodium nitrite (20 g.). The flocculent precipitate that first formed redissolved, and effervescence followed by precipitation ensued. After 2 hours the solid was collected and washed with cold water. It was dissolved in hot water and 10

N-sodium hydroxide was added. 1-amidino-3-(4-cyanophenyl)urea separated as rather discolored prismatic needles, M.P. 205° with effervescence.

EXAMPLES 10 AND 11

Tablets of 1 - amidino-3-(2-chloro-4-cyanophenyl)urea ethanesulphonate were prepared from the following ingredients:

| Example | 11 | 12 |
| --- | --- | --- |
| Amidinourea ethanesulphonate, mg | 100 | 200 |
| Lactose B.P., mg | 125 | 100 |
| Starch B.P., mg | 60 | 75 |
| Magnesium stearate B.P., mg | 5 | 10 |

The tablets of Example 10 were prepared by moist granulation and compression using a 10% gelatin solution as a granulating agent; and those of Example 11 using an alcoholic solution of polyvinylpyrrolidine.

EXAMPLE 12 p-Aminobenzotrifluoride hydrochloride (7.92 g.), dicyandiamide (10.08 g.), concentrated hydrochloric acid (7.04 ml.) and water (20 ml.) were heated under reflux for 15 minutes and the resulting solution was cooled and made alkaline. The base separated as an oil which slowly solidified and was extracted with ether. The extract was dried with anhydrous sodium sulphate and evaporated, and the residue was heated at 90° in solution in N-ethanesulphonic acid (100 ml.). After 2 hours the reaction mixture was cooled and the crystalline product was collected (6.5 g.). Recrystallization from methanol afforded 1 - amidino-3-p-trifluoromethylphenylurea ethanesulphonate, M.P. 222°, as white prisms (the base crystallized from water in white leaflets, M.P. 173°).

EXAMPLE 13

4-chloro-3-nitroaniline (6.8 g.), dicyandiamide (5.04 g.) and 4 N-HCl (15 ml.) were heated under reflux for 15 minutes and the reaction mixture was filtered while hot from a small residue. The filtrate was made alkaline, and the crude basic material that separated was collected and lixiviated with cold 0.2 N-acetic acid (total of 300 ml.). The undissolved residue (2.3 g.) was crystallized from alcohol and gave buff prisms of the sparingly-soluble acetate of 1-amidino-3-(4-chloro-3-nitrophenyl)urea, M.P. 175.5° with effervescence. The acetic acid extract was made alkaline and the precipitated base was crystallized from aqueous alcohol, affording brown prisms (6.5 g.) of 1-(4-chloro-3-nitro)phenylbiguanide, M.P. 164°. This biguanide was converted in the manner described in Example 1 into 1-amidino-3-(4-chloro-3-nitrophenyl)urea ethanesulphonate which crystallized from methanol in pale yellow prisms, M.P. 214–215°. The base crystallized from alcohol in yellow needles, M.P. 213° with effervescence.

EXAMPLE 14

2-chloro-5-nitrobenzotrifluoride (J. Org. Chem., 1957, 22, 300) (22.5 g.) was added dropwise with stirring to a solution of stannous chloride dihydrate (67.8 g.) in ethanol (325 ml.) and concentrated hydrochloric acid (60 ml.). After the addition, the solution was heated on the steam-bath for 30 minutes. Alcohol was distilled off and the residue was poured into excess of 10 N-NaOH. The basic oil thus liberated was collected in ether, dried with anhydrous sodium sulphate, and distilled. 4-chloro-3-trifluoromethylaniline was obtained, M.P. 118–120°/ 17 mm. Hg; refractive index $n_D^{17°}$ 1.5150. The product crystallized and had M.P. 38–39°.

This aniline (5.9 g.), dicyandiamide (5.5 g.) and 4 N-HCl ,15 ml.) were heated under reflux for 15 minutes. With cooling a crystalline hydrochloride separated (6 g.) which, on recrystallization from water, gave white leaflets of 4-chloro-3-trifluoromethylphenylbiguanide hydrochloride, M.P. 210–211°. A solution of the base of this biguanide (3.5 g.) in normal methane-sulphonic acid was heated to 95° and after 25 minutes crystals began to separate. After 2.5 hours the reaction mixture was cooled, and the crude product collected and recrystallized from methanol. 1-amidino-3-(4-chloro-3-trifluoromethyl)phenylurea methanesulphonate crystallized as white needles, M.P. 239–240° with decomposition.

EXAMPLE 15

3-chloro-4-cyanoaniline (15.2 g.), dicyandiamide (16.8 g.) and 4 N-hydrochloric acid (50 ml.) were heated under reflux until solid began to separate. The reaction mixture was then kept at 100° for 30 minutes, cooled and filtered. The solid was dried, and heated with alcohol (200 ml.). After cooling, the residual solid (23 g.) was collected, washed with alcohol and dried. This substance, 3-chloro-4-cyanophenylbiguanide hydrochloride, M.P. 257–258°, with decomposition, was dissolved in boiling water (300 ml.) and the solution was made alkaline with 10 N-sodium hydroxide. After cooling, the biguanide base was collected and washed with water, M.P. 174–175° with effervescence, pure enough for the next step.

The base (16.4 g.) was dissolved in N-ethanesulphonic acid (164 ml.) and the solution was kept at 100° for 2 hours and then cooled. The crystalline 1-amidino-3-(3-chloro-4-cyanophenyl)urea ethanesulphonate thus obtained had M.P. 223–224° with effervescence. Recrystallization from water or methanol gave colorless prims of similar melting-decomposition properties. This salt was dissolved in hot water and the solution was made alkaline (10 N-sodium hydroxide). The base separated in white leaflets, M.P. 212–213° with effervescence, little changed by recrystallization from alcohol.

EXAMPLE 16

3-chloro-4-cyanoaniline (1.52 g.), dicyandiamide (0.84 g.) and N-ethanesulphonic acid (20 ml.) were heated at 100° for 2 hours. After cooling, the solid product was collected by filtration, dried, and then heated with alcohol. After cooling, the undissolved solid was collected and washed with alcohol. The crystalline residue, M.P. 223° with decomposition, was identical with the ethanesulphonate of Example 2.

When N-ethanesulphonic acid was replaced by N-methanesulphonic acid, the corresponding methanesulphonate, M.P. 249–250° with decomposition, was produced.

EXAMPLE 17

3-chloro-4-cyanoaniline (1.52 g.), dicyandiamide (1.68 g.) and N-hydrochloric acid (30 ml.) were heated under reflux for 15 minutes. Some decolorizing charcoal was added, followed by filtration at the boiling point. The filtrate deposited white needles of 1-amidino-3-(3-chloro-4-cyanophenyl)urea hydrochloride, which decomposed about 250°.

The same product was obtained when 3-chloro-4-cyanophenylbiguanide was heated for a short period under reflux with dilute hydrochloric acid.

EXAMPLE 18

1-amidino-3-(3-chloro-4-cyanophenyl)urea ethanesulphonate (1.74 g.) was dissolved in boiling methanol (150 ml.) and the solution was treated with a solution of dry sodium embonate (1.08 g.) in methanol (50 ml.) and water (50 ml.). The solution was heated under reflux and in a few moments 1-amidino-3-(3-chloro-4-cyanophenyl) urea embonate crystallized. It was collected by filtration and washed with water, M.P. 195° with effervescence.

EXAMPLE 19

The urethane, methyl 3-chloro-4-cyanophenyl carbamate, M.P. 136°, was prepared from 3-chloro-4-cyanoaniline by the method of Example 7. This substance (4.5 g.) was heated under reflux for 4 hours with a solution of guanidine (from 2.5 g. of the hydrochloride) in ethanol.

With cooling, crystalline solid (0.5 g.) separated, evaporation giving a second crop (0.9 g.). This crude base was purified by dissolving it in the calculated amount of hot aqueous ethanesulphonic acid. With cooling there separated 1-amidino-3-(3-chloro-4-cyanophenyl)urea ethanesulphonate, M.P. 223–224° with decomposition, from which the base, M.P. 211.5° with decomposition, was obtained. These products were identical with those of Example 15.

EXAMPLE 20

2,4,5-trichloroaniline (9.8 g.), dicyandiamide (8.4 g.) and 4 N-hydrochloric acid (50 ml.) were heated in a bath at 100° for 2 hours and then steam-distilled to remove unchanged trichloroaniline. The liquid in the still was treated with charcoal and then made alkaline (10 N-sodium hydroxide). Crude 1-amidino-3-(2,4,5-trichlorophenyl)urea was thus precipitated. It was purified as the methanesulphonate by crystallizing from the calculated amount of dilute aqueous methanesulphonic acid, this salt forming white silky needles which began to decompose about 236°. The base was crystallized from aqueous alcohol and formed white silky needles of a monohydrate, M.P. 180.5° with effervescence.

EXAMPLE 21

4-nitro-3-trifluoromethylaniline (6.18 g.), dicyandiamide (7.54 g.) and 4 N-hydrochloric acid (22.5 ml.) were heated under reflux for 10 minutes to provide a clear solution. The solution was made alkaline (10 N-sodium hydroxide) and the precipitate that formed was collected and washed with water. The crude base was extracted with hot 2 N-acetic acid (50 ml.) and the extract was made alkaline (10 N-sodium hydroxide), thus precipitating 4-nitro-3-trifluoromethylbiguanide, which gave orange prisms from alcohol, M.P. 149–150°.

Reaction of this biguanide (4.8 g.) with normal methanesulphonic acid by the method of Example 14 gave 1 - amidino - 3 - (4 - nitro-3-trifluoromethylphenyl)urea methanesulphonate in yellow needles, M.P. 245° with decomposition; the base, on crystallization from aqueous alcohol, formed pale yellow silky needles, M.P. 202° with effervescence.

EXAMPLE 22

The procedure of Example 15 was applied to 4-cyano-3-fluoroaniline (U.S. application No. 522,817). The biguanide hydrochloride separated from the reaction mixture and had M.P. 274° with decomposition the base formed white plates, M.P. 169.5° with effervescence.

1-amidino-3-(4-cyano-3-fluorophenyl)urea methanesulphonate crystallized from water in white prisms, M.P. 241–242° with effervescence; the base had M.P. 205–206° with effervescence.

EXAMPLE 23

The procedure of Example 21 was applied to 3-chloro-4-nitroaniline. The biguanide crystallized from alcohol in yellow leaflets, M.P. 178°, and 1-amidino-3-(3-chloro-4-nitrophenyl)urea methanesulphonate from water in yellow prisms, M.P. 241° with decomposition.

What I claim is:
1. A compound of the formula

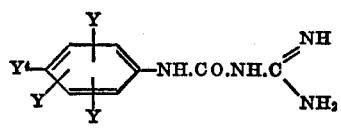

and pharmaceutically acceptable acid addition salts thereof wherein $Y^4$ is halogen or cyano and Y is hydrogen, halogen, methyl or cyano; provided that one of the substituents $Y^4$ and the Y's but not both is always cyano, and that not more than three of the substituents $Y^4$ and the Y's is a substituent other than hydrogen; and provided that not than one of the substituents $Y^4$ and the Y's is methyl.

2. A compound which is 1-amidino-3-(4-cyano-2-methylphenyl)urea and pharmaceutically acceptable acid addition salts thereof.

3. A compound of the formula

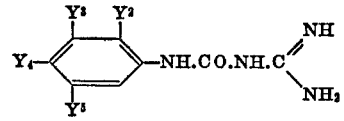

and pharmaceutically acceptable acid addition salts thereof wherein $Y^5$ is halogen or hydrogen,
$Y^2$ is halogen, hydrogen or methyl,
$Y^3$ is halogen, hydrogen, methyl or cyano, and
$Y^4$ is halogen, or cyano; provided that where $Y^5$ is halogen, $Y^4$ is cyano and $Y^3$ is halogen and $Y^2$ is hydrogen; and provided that where
$Y^5$ is hydrogen, $Y^4$ is cyano, $Y^2$ and $Y^3$ are hydrogen, halogen and methyl and at least one of $Y^2$ and $Y^3$ is hydrogen, or $Y^3$ is cyano, $Y^4$ is halogen and $Y^2$ is hydrogen;
always provided that one of $Y^3$ and $Y^4$ but not both is cyano and one of $Y^2$, $Y^3$ and $Y^5$ is always hydrogen.

4. A compound according to claim 3 in which halogen is chlorine, bromine or fluorine.

5. A compound of the formula

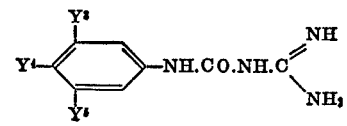

and pharmaceutically acceptable acid addition salts thereof, wherein $Y^3$ and $Y^5$ are halogen selected from the class consisting of chlorine, bromine, fluorine and iodine, and $Y^4$ is cyano.

6. A compound according to claim 5 which is 1-amidino-3-(3,5-dichloro-4-cyanophenyl)urea and pharmaceutically acceptable acid addition salts thereof.

7. A compound of the formula

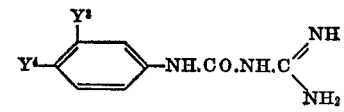

8. A compound which is 1-amidino-3-(4-cyano-3-fluorophenyl)urea and pharmaceutically acceptable acid addition salts thereof.

References Cited
UNITED STATES PATENTS
3,539,616  11/1970  Walls _____ 260—465

LEWIS GOTTS, Primary Examiner

D. H. TORRENCE, Assistant Examiner

U.S. Cl. X.R.

260—553 A; 424—304, 322